Figure 1:
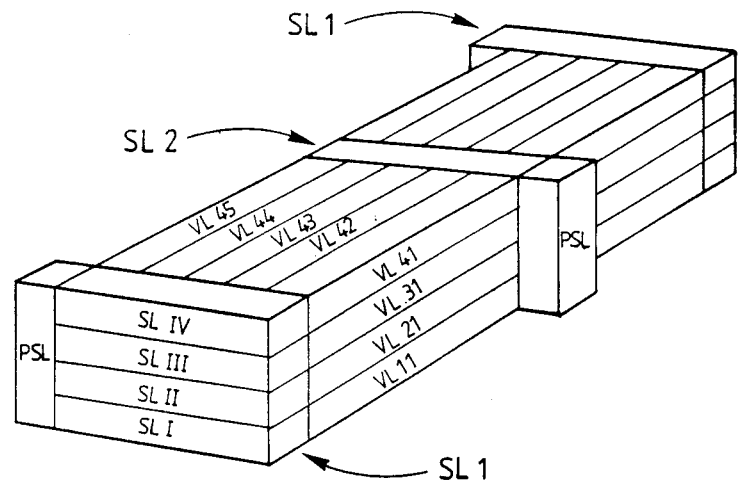

United States Patent [19]

Suominen

[11] Patent Number: 4,972,778
[45] Date of Patent: Nov. 27, 1990

[54] ARRANGEMENT RELATING TO A CABLE WINDING DEVICE INSTALLED AT THE END OF A STORE LINE OR TRANSFER LINE

[76] Inventor: Seppo K. Suominen, SF-76850 Naarajärvi, Finland

[21] Appl. No.: 358,372
[22] PCT Filed: Nov. 24, 1987
[86] PCT No.: PCT/FI87/00157
  § 371 Date: May 17, 1989
  § 102(e) Date: May 17, 1989
[87] PCT Pub. No.: WO88/03904
  PCT Pub. Date: Jun. 2, 1988

[30] Foreign Application Priority Data

Nov. 25, 1986 [FI] Finland ............................ 864788
Oct. 21, 1987 [FI] Finland ............................ 874631

[51] Int. Cl.⁵ ................................................ B65G 1/06
[52] U.S. Cl. ...................................... 104/183; 104/94; 212/214; 242/158.2; 414/277
[58] Field of Search ................ 212/214; 242/158.2; 414/277, 278, 280; 104/94, 95, 173

[56] References Cited

U.S. PATENT DOCUMENTS

| | | | |
|---|---|---|---|
| 72,801 | 12/1867 | Coffman | 242/158.2 |
| 150,612 | 5/1874 | Reedy | 242/158.2 |
| 272,422 | 2/1883 | Flanigan | 242/158.2 |
| 539,995 | 5/1895 | Nason | 242/158.2 |
| 2,293,730 | 8/1942 | Guttman | 242/158.2 |
| 2,321,780 | 6/1943 | Tondeur | 242/158.2 |
| 3,662,860 | 5/1972 | Burch | 414/277 |
| 3,718,097 | 2/1973 | La Tourneau et al. | 414/277 |
| 3,788,491 | 1/1974 | Stone | 104/183 |
| 3,850,316 | 11/1974 | Schmitt | 414/280 |
| 4,401,406 | 8/1983 | Rovira | 212/214 |

FOREIGN PATENT DOCUMENTS

| | | | |
|---|---|---|---|
| 983027 | 12/1982 | U.S.S.R. | 242/158.2 |
| 2094770 | 9/1982 | United Kingdom | 414/277 |

Primary Examiner—Sherman Basinger
Assistant Examiner—Thomas J. Brahan
Attorney, Agent, or Firm—Jones, Askew & Lunsford

[57] ABSTRACT

The object of the invention is an arrangement relating to the cable winding device that moves the transfer vehicles (2) of a store and/or transfer line (1, 10), located at the end of the line, in which the store line (1) is formed of sequential store places, and in which the store line (1) is crossed by at least one transverse transfer line (10), and in which the packages on the store line (1) are transported by being carried on the lifting device of the transfer vehicle, in which the aforementioned cable winding device includes a motor (9) and a cable drum (7) turned by it or a corresponding cable collecting device. By means of the invention an attempt is made to achieve a precisely operating cable winding device to be installed at the end of a line, which makes simple crossing arrangements possible. In accordance with the invention the motor (9) and cable drum (7) are installed on a frame (16) that moves laterally, and which is connected to the main frame by means of a screw transmission from the drum (7) axle or transmission axle, and in which the pitch of the screw thread is adapted to correspond to the pitch on the cable drum (7) of the cable device (5) in order to keep the winding point always at the same place when the frame (16) and the cable drum (7) with it moves in a lateral direction.

7 Claims, 3 Drawing Sheets

ARRANGEMENT RELATING TO A CABLE WINDING DEVICE INSTALLED AT THE END OF A STORE LINE OR TRANSFER LINE

The object of the invention is an arrangement relating to the cable winding device that moves the transfer vehicles of a store line or transfer line at the end of which it is installed, and in which the store line is formed by sequential store places, and in which the store line is crossed by at least one transverse transfer line, and in which the packages on the store line are transported by being carried by the lifting device of a transfer vehicle that travels on rails, and in which the aforementioned cable winding device includes a motor and a cable drum turned by it, or a corresponding cable collecting device.

International publication WO85/04638 (FI 842409) shows one type of sequential store, in which the packages are stored sequentially on top of rails and in which the transfer device that travels under the packages includes a lifting device to lift a package onto the transfer vehicle and transport it. The system includes placing devices that control the placing of the packages at the desired point on the store line. The movement of the transfer vehicle takes place with the aid of a cable winding device, which includes a cable drum driven by an electric motor. One end of the cable wound round the drum is secured directly to the transfer vehicle, and the other end also to the transfer vehicle after first passing over a pulley at the opposite end of the rails. In the aforementioned WO publication a solution is shown in which transaction is transmitted to the cable by means of only one cable wheel. However, in this slipping can take place, which makes the measurement of the placing difficult. The cable must thus be wound round the drum at least once for the grip to be sufficient. The winding point then moves laterally along the surface of the drum by at least the thickness of the cable during one revolution of the drum.

Thus the drum must be in any case so wide that it is able to wind onto its surface in one layer an amount of cable that corresponds to the entire length of the store line. In practice the cable is not wound endlessly round the drum as both cables that come to the drum end at the ends of the drum and an amount of cable corresponding to the length of the line is held on the surface of the drum. Slipping is then avoided entirely and placing can be measured reliably from the axis of the drum. The direction of winding of the cables on the drum is arranged so that as the one cable is running onto the drum the other is running off it. The surface of the drum has a spiral groove on it that directs the cable precisely to the side of the previous coil as the neighbouring coils must not press against one another. The other cable runs off the other side of the drum, which means that as the drum revolves there is always the same total number of coils on its surface.

The aforementioned WO publication does not show the arrangement of a crossing in detail. From the point of view of the use of space it is optimal that the transfer vehicles on both the store line and the transverse line are carried on rail underneath. However, the arrangement of the crossing is greatly eased if the rails of the transverse line are made to be carried on rails above. In both cases the precise operation of the cable winding device is important as the cable winding device is used to determine placing. In the previous case the crossing of the winding cables of the store transfer vehicle and the rails of the transverse line causes a problem. Because the winding point on the surface of the winding drum moves, the drum cannot be installed close to a crossing, because then the break reserved for the cables would be long. Certainly the winding drum could be placed sufficiently far outside of the line and both cables could be led from a fixed point in the direction of the line. This has two drawbacks. First of all the arrangement demands extra space, and secondly the measurement of the distance from the drum to the transfer vehicle could no longer be done linearly.

With the aid of the invention an attempt is made to achieve a cable winding device to be installed at the end of the line, which operates precisely and makes simple crossing arrangements possible.

Figure 4:
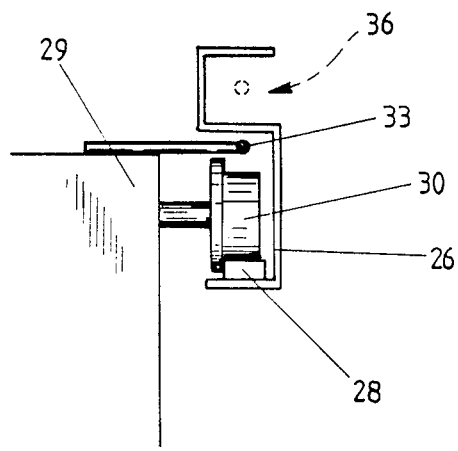

In what follows the invention is illustrated by reference to the accompanying illustrations, which show various forms of application of the invention. FIG. 1 shows a store arrangement in its entirety FIG. 2 shows one crossing in a sequential store in principle FIG. 3 shows another type of crosssing in a sequential store in principal FIG. 4 shows a detail of the crossing arrangement in FIG. 3

The store consists of several parallel and superimposed store lines (VL) and these are connected at the ends and in the middle by transverse lines SL1-3) for the circulation of the packages. In addition the store includes two vertical transfer devices (PSL). Because of the central transverse lines (SL2) the sorting speed of the store grows considerably. In addition they limit the area of effect of a faulty line to nearly insignificance. As such the principle of the store is the same as that showing publication-WO85/04638.

Figure 2:
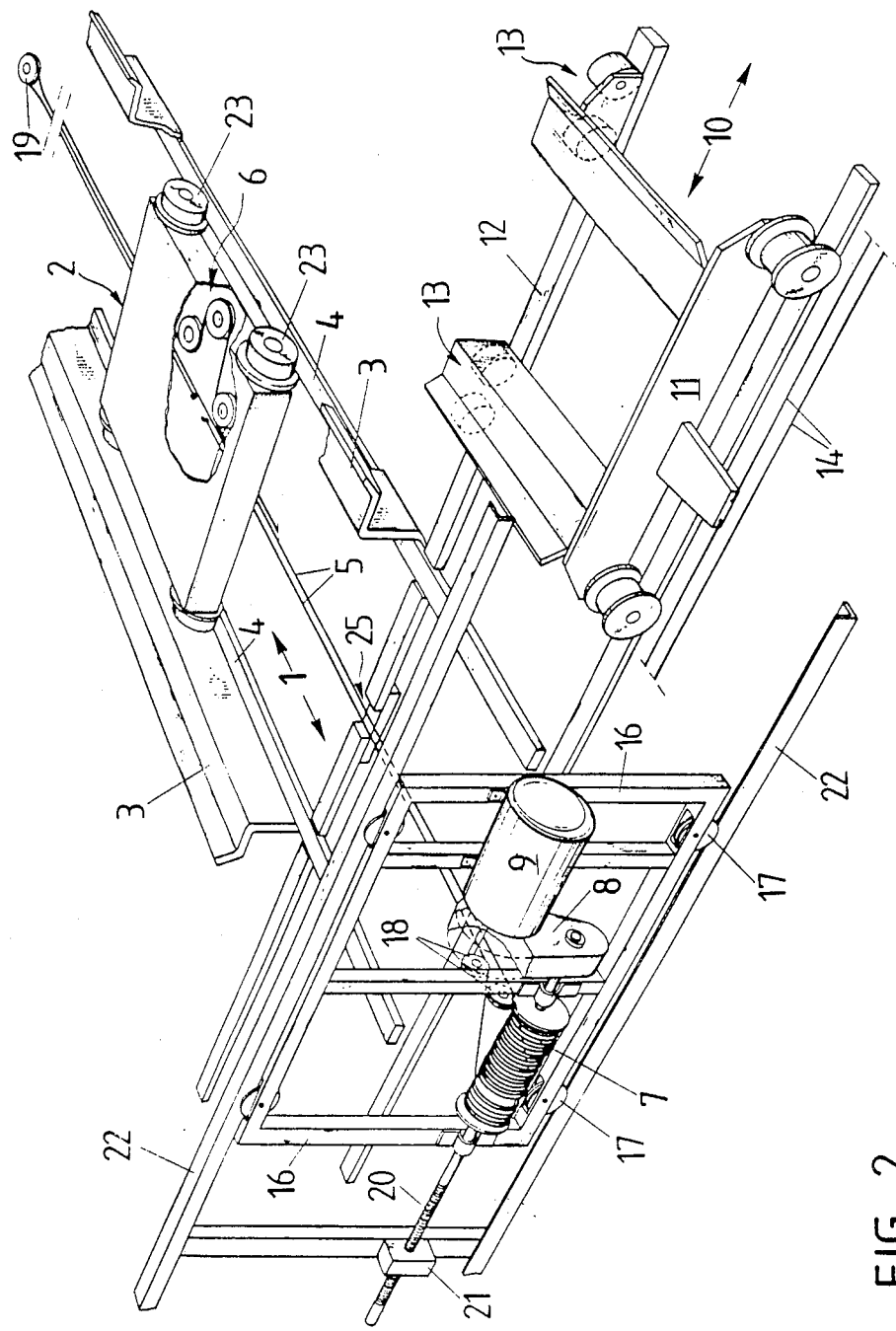
Figure 3:
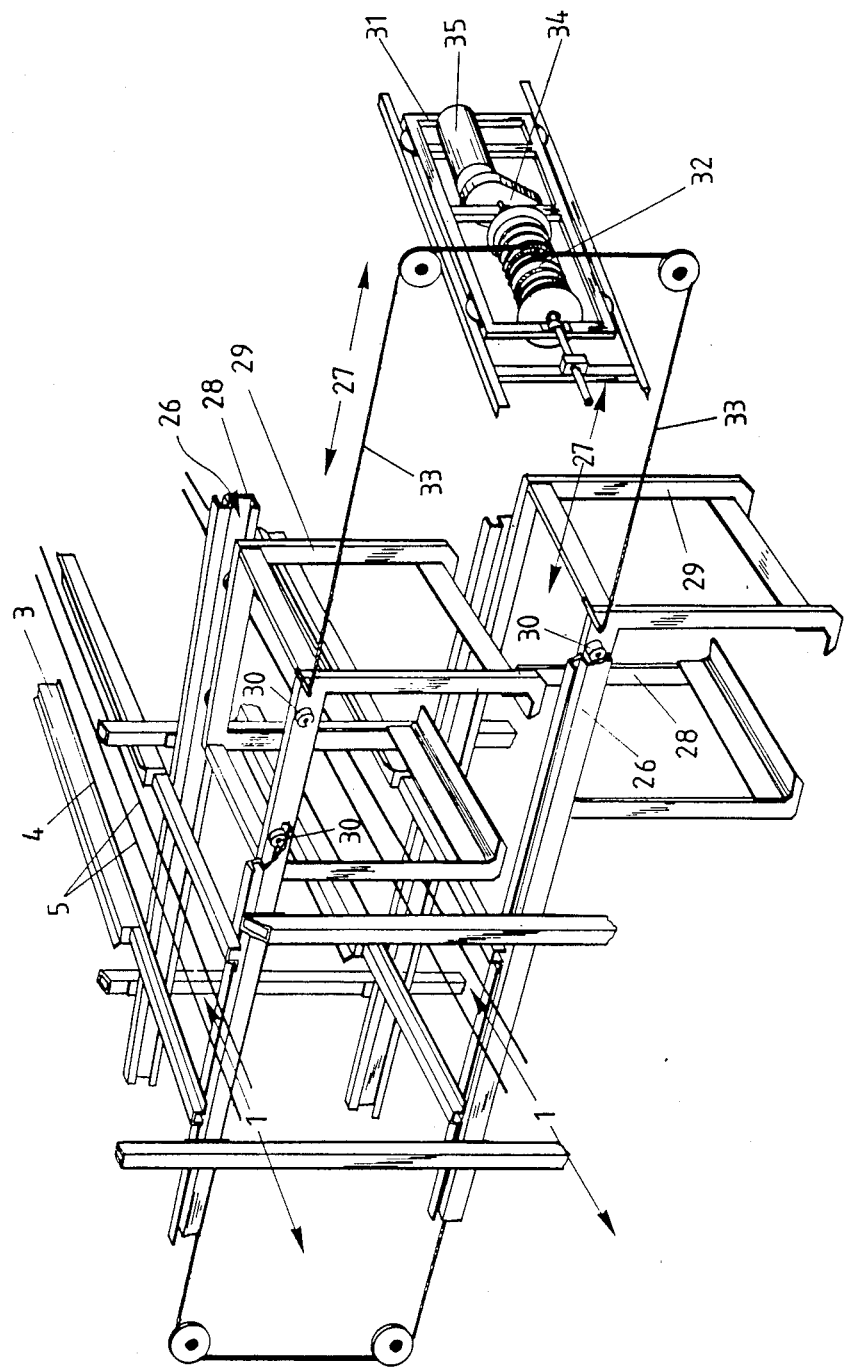

The crossings of the end transfer lines SL1 and SL3 with the store lines are as shown in FIG. 2. Transfer vehicles 2 and 11, whose transfer on the lines takes place by means of cable devices 5 and 14, move on rails 4 and 12 on lines 1 and 10. The packages are stored sequentially on the base 3, from which the transfer vehicle 2 can lift them from underneath to carry and transport them. The transfer vehicle 11 of the transverse transfer line 10 forms a single store place, on which a package can be placed, from the point of view of store line 1.

Flanged wheels 23 and 24, which provide lateral support to guide the transfer vehicles 2 and 11 on the track, are used in transfer vehicles 2 and 11. Because of this, the transverse rails (12) must be furnished with breaks so that the transfer vehicle 2 of line 1 can go into transfer vehicle 11 of transverse line 10 to lift a package onto or off from it. This is achieved in the situation shown in FIG. 1 in such a way that transfer vehicle 11 of transverse line 10 first moves into the place of store line 1, after which transfer vehicle 2 is able to move it between its fork.

The cable of the cable devices 5 for the transfer device of store line 1 also require break 25 in the same rail 12. The transfer vehicle 11 of the transverse line 10 is able to pass the breaks easily by means of its double wheels 13. Break 25, reserved for the cables, has been kept reasonably short by directing the cables 5 through the pulleys 18 located in the frame from the drum 7 to the transfer vehicle 2 moving on store line 7. One of the cables 5 is connected to the transfer vehicle 2 via the fixed pulley wheel 19 at the opposite end of store line 1.

Cable drum 7 has been able to be brought close to the fixed pulleys 18 by locating it on frame 16, which moves on wheels 17. The wheels 17 are placed to move along the transverse rails 22 that belong to the frame. An electric motor 9 and gear-box 8 are located on the frame 16. A pulse sensor for placing measurement is also installed on the axle of drum 7. The axle of drum 7 includes an extension 20, which is threaded and is used to act as a transfer screw together with the corresponding nut component 21 attached to the frame. When drum 7 turns these move the frame 16 and with it drum 7 itself. The pitch of the transfer screw is set to correspond to the pitch of the cables 5 on the surface of the drum 7, so that the cables 5 run on and off at precisely the same point irrespective of the position of transfer vehicle 2, i.e. of the distribution of cable in relation to each side. In this way there is no kind of lateral load on pulleys 18 attached to the frame when the point for winding on and off is located precisely at them.

Even though a crossing in accordance with FIG. 2 could, with slight adaption, be used for a through crossing, this can, however, be carried out more simply with the aid of transverse transfer lines 27 as in FIG. 3. The central transfer lines SL2 of the store in FIG. 1 have been realized in this way. The transfer vehicles 29 of the transverse line 27 run on their wheels 30 along rails 28. The placing of these rails 28 and traction cables 33 above the store lines 1 reduces the capacity of the store to some extent. The rails 28 and traction cables 33 are placed in a common channel 26 formed from a support beam, the space required by which cannot be used at all on store line 1.

In the arrangement shown in FIG. 3 the transfer vehicles 29 of two superimposed transverse lines 27 are used by means of a common cable winding device. The return cables are combined on the opposite side of this.

The operation of transfer line 27 corresponds to the operation of transfer line 10 in FIG. 2. The transfer vehicle 29 forms places, as a continuation of base 3 store line 1, on which a package can be placed and thereafter moved in lateral direction.

In this too the cable winding apparatus is formed of cable drum 32 located in frame 31, transmission 34, and motor 53. The movement of the frame 31 is synchronized with the pitch of the cables 33 on the surface of the drum 32, so that the traction point remains the whole time at the same place.

FIG. 4 shows in detail the installation of the traction cable 33 of transfer vehicle 29 and carrier wheel 30 in a channel 26 formed from a carrier beam. Wheel 30 runs on rail 28. FIG. 4 also shows the possible arrangement of the return cable when each line has its own cable winding apparatus. This return cable is then located in the upper channel 36 of tha carrier beam.

It is clear to one versed in the art that the invention can be applied in numerous ways deviating from the above examples.

I claim:

1. Apparatus relating to a cable winding device for moving a transfer vehicle (2), located at the end of a store line (1, 10) in which the store line (1) is formed of sequential store places and in which the store line (1) is crossed by at least one transverse transfer line (10), and in which the package on the store line (1) are transported by a transfer vehicle (2), and in which the cable winding device includes a motor (9) and a cable drum (7) rotated by the motor, the apparatus comprising:

cable means (5) drawn by the cable drum (7) and operatively associated with the transfer vehicle;

rails (12) associated with the transverse transfer line (10) and having a break (25) through which the cable means (5) is drawn;

a transfer vehicle (11) associated with the transverse transfer line (10) and having sets of wheels (13) supporting the transfer vehicle on the rails (12), each set having two wheels one immediately after the other that can cross the break (25) in the rails (12) on which the transfer vehicle (11) moves;

the cable drum (7) being mounted on a frame (16) which is transversely movable with respect to a main frame;

a worm screw drive (20, 21) rotatable with the cable drum and connected between the movable frame (16) and the main frame; and the pitch of the worm screw drive corresponds to the pitch of the cable means drawn by the cable drum (7), so that the frame (16) and with it the cable drum (7) move laterally in order to keep the winding point of the cable drum always in place relative to the break (25) through which the cable means is drawn.

2. Apparatus as in claim 1, wherein:

the worm screw drive (20, 21) comprises a continuation of an axle of the cable drum (7) and has a screw thread formed thereon; and further comprising a counter part (25) equipped with a nut thread engaging the screw thread; and the counter part is attached to the main frame.

3. Apparatus as in either of claims 1 or 2, wherein:

the movable frame (16) is equipped with wheels (17) which runs on transverse guide means (22) associated with the main frame.

4. Apparatus related to a cable winding device (32) for moving a transverse transfer vehicle (29) interconnecting two or more store lines (1) which are equipped with transfer vehicles (2) running on rails, the apparatus comprising:

rails (28) located above the store lines (1) and supporting the transverse transfer vehicle (29);

the cable winding device (32) being mounted in a frame (31) transversely movable with respect to the rails (28);

cable means (33) drawn at a certain pitch by the cable winding device (32) and operative to move the transverse transfer vehicle (29) along the rails (28);

the cable means (33) traveling in a channel (26) located above the store lines (1) and open from the side, so as to prevent the cable means from hanging toward the store lines (1);

the cable winding device having an axle operative to drive a worm screw connected to a main frame which is stationary relative to the transversely movable frame (131); and the pitch of the worm screw corresponds to the drawing pitch of the cable winding device (32) so as to keep the winding point of the cable winding device always in the same place as the cable means (33) is drawn through the channel (26).

5. Apparatus as in claim 4, wherein:

the cable winding device comprises a cable drum having an axle;

the worm screw comprises a continuation of the axle on which a screw thread is formed; and further comprising nut means mounted in fixed relation to the transversely movable frame and engaged by the screw thread.

6. Apparatus as in either of claims 4 or 5, wherein:

the movable frame is equipped with wheels which run on transverse guide means fixed in relation to the rails (28).

7. Apparatus as in either of claims 4 or 5, wherein the rails (28) are formed by a supporting beam, and the channel (26) in which the cable means (33) travels is formed by the supporting beam.

* * * * *